(12) United States Patent
Boulzaguet

(10) Patent No.: US 12,188,412 B2
(45) Date of Patent: Jan. 7, 2025

(54) HEAT EXCHANGER FOR COOLING AN AIRCRAFT PROPULSION ENGINE

(71) Applicant: SOGECLAIR SA, Blagnac (FR)

(72) Inventor: Alexandre Boulzaguet, Toulouse (FR)

(73) Assignee: SOGECLAIR SA, Blagnac (FR)

( * ) Notice: Subject to any disclaimer, the term of this patent is extended or adjusted under 35 U.S.C. 154(b) by 358 days.

(21) Appl. No.: 17/619,996

(22) PCT Filed: Jun. 15, 2020

(86) PCT No.: PCT/EP2020/025284
§ 371 (c)(1),
(2) Date: Dec. 16, 2021

(87) PCT Pub. No.: WO2020/253990
PCT Pub. Date: Dec. 24, 2020

(65) Prior Publication Data
US 2022/0356843 A1  Nov. 10, 2022

(30) Foreign Application Priority Data
Jun. 17, 2019 (FR) ..................... 1906469

(51) Int. Cl.
| F02C 7/14 | (2006.01) |
| F28D 7/16 | (2006.01) |
| F28D 9/00 | (2006.01) |
| F28D 19/04 | (2006.01) |
| F28F 3/08 | (2006.01) |
| F28F 13/08 | (2006.01) |

(52) U.S. Cl.
CPC .............. *F02C 7/14* (2013.01); *F28D 7/1669* (2013.01); *F28F 13/08* (2013.01); *F28D 9/0012* (2013.01); *F28D 19/044* (2013.01); *F28F 3/08* (2013.01)

(58) Field of Classification Search
CPC .... F28D 9/0012; F28D 19/044; F28D 7/1669; F02C 7/14; F28F 3/08
See application file for complete search history.

(56) References Cited

U.S. PATENT DOCUMENTS

| 2,171,047 | A | | 8/1939 | Richardson | |
| 2,792,200 | A | * | 5/1957 | Huggins | F28F 3/025 165/125 |
| 3,289,757 | A | * | 12/1966 | Rutledge | F28D 9/0018 165/166 |

(Continued)

FOREIGN PATENT DOCUMENTS

| FR | 899582 | 6/1945 |
| FR | 2959209 | 10/2011 |

(Continued)

*Primary Examiner* — Paul Alvare
(74) *Attorney, Agent, or Firm* — Defillo & Associates, Inc.; Evelyn A. Defillo

(57) ABSTRACT

The heat exchanger is generally ring-shaped and includes a plurality of heat exchange modules (2), which are mutually independent, being distributed about the axis (A1) of the ring. The modules (2) are assembled with one another, being successively spaced apart in pairs, a space (E1) being created between two adjacent modules (2). At least one of the spaces (E1) receives at least one conductive heat-transfer element (7) extending between respective walls of at least two adjacent the modules (2) which are oriented facing one another.

16 Claims, 2 Drawing Sheets

(56) References Cited

U.S. PATENT DOCUMENTS

| | | | | |
|---|---|---|---|---|
| 3,385,353 A | * | 5/1968 | Straniti | F28D 9/0012 60/39.511 |
| 3,818,984 A | * | 6/1974 | Nakamura | F28F 3/025 165/157 |
| 3,831,374 A | | 8/1974 | Nicita | |
| 3,896,875 A | * | 7/1975 | Bolger | F28D 15/0208 165/104.25 |
| 4,098,330 A | * | 7/1978 | Flower | F28D 9/0018 165/166 |
| 4,213,294 A | | 7/1980 | Forster | |
| 4,347,896 A | * | 9/1982 | Rosman | F28D 9/0037 165/DIG. 392 |
| 4,438,809 A | * | 3/1984 | Papis | F28D 9/0018 165/166 |
| 4,582,126 A | * | 4/1986 | Corey | F28D 9/0018 165/145 |
| 5,004,044 A | * | 4/1991 | Horgan | F28F 3/083 165/145 |
| 5,060,721 A | * | 10/1991 | Darragh | F28D 9/0018 165/145 |
| 8,256,221 B2 | * | 9/2012 | Rubio | F23C 13/06 431/170 |
| 9,200,855 B2 | * | 12/2015 | Kington | F02C 7/08 |
| 10,100,740 B2 | * | 10/2018 | Thomas | F28D 1/0358 |
| 10,240,522 B2 | | 3/2019 | Jones et al. | |
| 11,585,605 B2 | * | 2/2023 | Hart | F28D 1/0316 |
| 2008/0095611 A1 | * | 4/2008 | Storage | F28F 1/022 415/116 |
| 2010/0043386 A1 | | 2/2010 | Perveiler | |
| 2012/0216544 A1 | * | 8/2012 | Eleftheriou | F02C 7/10 60/39.511 |
| 2013/0186102 A1 | * | 7/2013 | Lo | F02K 3/075 60/785 |
| 2013/0236299 A1 | | 9/2013 | Kington | |
| 2017/0023017 A1 | * | 1/2017 | Dreischarf | B64D 29/00 |
| 2018/0058327 A1 | * | 3/2018 | Tajiri | F02K 3/04 |

FOREIGN PATENT DOCUMENTS

| | | | |
|---|---|---|---|
| GB | | 302562 | 12/1928 |
| GB | | 843965 | 8/1960 |
| GB | | 843965 A * | 8/1960 |

* cited by examiner

HEAT EXCHANGER FOR COOLING AN AIRCRAFT PROPULSION ENGINE

CROSS REFERENCE TO RELATED APPLICATION

This application is a national stage entry of PCT/EP2020/025284 filed Jun. 15, 2020, under the International Convention and claiming priority over French Patent Application No. FR1906469 filed Jun. 17, 2019.

TECHNICAL FIELD

The invention relates to the field of aircraft, the propulsion thereof being provided by at least one powertrain. The invention relates to a heat exchanger for cooling an engine which such a powertrain comprises.

PRIOR ART

Amongst aircraft, some are motorized for the propulsion thereof. To this end, such aircraft are provided with a powertrain comprising an engine and a heat exchanger for cooling the engine. Conventionally, the heat exchanger comprises at least two respective fluid circulation paths. One of the fluids is a fluid for cooling the engine, such as oil for example, which has to be cooled by the other of the fluids formed from the air flow admitted inside the heat exchanger as a result of the advance of the aircraft.

Heat exchangers of annular configuration which comprise, on the one hand, first channels for the circulation of air flows inside the heat exchanger and, on the other hand, second channels for the circulation of cooling fluid admitted inside the heat exchanger are known. The first channels and the second channels generally extend along the axial extension of the heat exchanger and are radially arranged alternately to optimize the heat exchange between the air flows and the cooling fluid.

It is more specifically known to arrange such a heat exchanger in a modular heat exchanger comprising a plurality of heat exchange modules which are independent of one another. The modules are distributed over a circumference around the axis of extension of the heat exchanger, being assembled successively in pairs with one another.

It is understood here that the independence of the modules is based on a structure and an operation of the modules independently of one another, each of the modules comprising their own fluid circulation paths. In other words, each of the modules comprises first channels and second channels, the cooling fluid being cooled independently inside each of the modules and then being returned back to the engine.

DISCLOSURE OF THE INVENTION

In this context, the subject of the invention is a modular heat exchanger for cooling an aircraft propulsion engine of the type described above.

An object of the invention is to propose such a heat exchanger, the structure thereof being optimized and the capacity thereof for cooling the cooling fluid being increased in order to optimize the performance of the heat exchanger.

A further object of the invention is to propose such a heat exchanger, the arrangement thereof making it possible to reduce the drag of the aircraft, in particular in order to utilize in an optimized manner the propulsion force of the aircraft provided by the engine with which it is equipped and/or in order to permit a satisfactory propulsion of the aircraft from an engine whose rated power is able to be reduced in an optimized manner.

A further object of the invention is to propose such a heat exchanger which is capable of satisfactorily cooling various types of propulsion engines of the aircraft, in particular an electric motor thereof.

The objects of the present invention are achieved individually or in combination by applying the following arrangements.

The invention relates to a heat exchanger for cooling an aircraft propulsion engine, the heat exchanger being generally ring-shaped and comprising a plurality of heat exchange modules which are mutually independent, being distributed circumferentially about the axis of the ring, said modules being assembled with one another, being successively spaced apart in pairs, each module comprising first channels for the circulation of the air flow generated by the advancing aircraft, in addition to second channels for the circulation of cooling fluid. A space traversed by the air flows generated by the advancing aircraft is created between two adjacent modules, at least one of said spaces receiving at least one conductive heat-transfer element extending between respective walls of at least two adjacent said modules which are oriented facing one another.

The modules have, in particular, substantially similar configurations and are independent of one another as mentioned above. The similarity of the modules is, in particular, relative to the arrangement and the disposition of the fluid circulation channels which they respectively comprise and which extend substantially along the axial extension of the heat exchanger. The first channels are channels for the admission and the circulation of the air flow inside the modules, in particular as a result of the advance of the aircraft, and the second channels are channels for the circulation of cooling fluid admitted inside the modules, the first channels and the second channels being created radially alternately inside each of the modules.

According to the invention, a heat exchanger of the aforementioned type is able to be recognized in that the at least one of said spaces receives at least one conductive heat-transfer element extending between the respective walls of at least two adjacent said modules which are oriented facing one another.

A "heat-transfer element" is understood to mean in this case a structural element which dissipates by conduction the calories, or by analogy frigories, which it receives to at least one of said walls with which the heat-transfer element is in contact.

More specifically, said spaces extend through the heat exchanger along the axial extension thereof, said at least one heat-transfer element being ventilated by an air flow generated by the advance of the aircraft. As a result, said at least one heat-transfer element is cooled by said air flow to which it is subjected and transfers the calories, or by analogy the frigories, which it receives to at least one of said opposing walls, the heat-transfer element being interposed therebetween.

As a result, the heat exchanger is provided with at least one additional thermal transfer heat exchanger which is received inside said one space, by being interposed between at least two adjacent modules, via said at least one heat-transfer element which is in contact with at least one of said walls facing one another of said adjacent modules. Moreover, the profile of said at least one heat-transfer element and/or the distribution inside one and the same space of a plurality of heat-transfer elements may be utilized to drain the air flow traversing the space which receives said heat-transfer element, by providing said air flow with a dynamic reducing the drag of the aircraft. Moreover, as a result of it preferably bearing against each of said opposing walls, said at least one heat-transfer element may be utilized as a reinforcing member for the heat exchanger against the deformation thereof.

Thus according to a further approach of the invention, at least two adjacent modules constituting the heat exchanger are spaced apart via said one additional thermal transfer heat exchanger.

According to one embodiment, said at least one heat-transfer element is integrated in at least one of said walls facing one another.

This makes it possible to simplify the structure of the additional thermal transfer heat exchanger and as a result to simplify the means for the installation thereof inside said at least one space. The integration of said at least one heat-transfer element in at least one of said walls may be advantageously implemented within the context of forming the modules by printing in three dimensions.

According to one embodiment, said walls facing one another inside the modules, of which the walls are respectively a constituent part, delimit a channel for the circulation of a cooling fluid inside the modules, such as oil or a state-changing, or in other words a phase-changing, coolant.

The reduction in temperature of the cooling fluid by the addition of frigories via said at least one heat-transfer element, or in other words via the additional thermal transfer heat exchanger, is promoted thereby.

Preferably, a plurality of heat-transfer elements are received in said at least one and the same space in order to optimize the efficiency of the additional thermal transfer heat exchanger.

Further preferably, a plurality of heat-transfer elements are each arranged in fins oriented substantially according to an overall plane extending between said walls facing one another.

This facilitates the integration of the heat-transfer elements in said at least one wall, whilst optimizing the efficiency of the additional thermal transfer heat exchanger.

Further preferably, a plurality of heat-transfer elements are distributed between the modules according to at least one guideline oriented according to a generatrix defining the surface of revolution of any one of the external face and the internal face of the ring. Preferably, a plurality of heat-transfer elements are distributed between the modules according to a plurality of said guidelines parallel with one another.

The surface of revolution of the ring is considered, in particular, on at least one of its faces oriented toward the exterior of the heat exchanger, both the external face of the ring identified by the external diameter of the ring and the internal face of the ring identified by the internal diameter of the ring. This makes it possible to avoid the possible formation of turbulence inside said at least one space.

According to one embodiment, the ring has along its edge a variation in thickness between its axial ends. The number of heat-transfer elements varies axially according to the variation in thickness of the edge of the ring.

The "edge of the ring" is understood to mean the dimension of the ring considered between its external diameter and its internal diameter. The variation in thickness of the edge of the ring is progressively continuous, in particular, between the axial ends of the ring.

Preferably, the generatrices respectively defining the external face of the ring of larger diameter and the internal face of the ring of smaller diameter are curved.

Further preferably, the external and internal diameters of the ring vary progressively between the axial ends thereof. More specifically, the external and internal diameters of the ring considered at the axial upstream end of the ring have greater dimensions than respectively the external and internal diameters of the ring considered at the axial downstream end of the ring. The concepts "upstream" and "downstream" are considered according to the direction of circulation of the air flows inside the heat exchanger which is positioned in the operating state on the advancing aircraft. In the present example, the air flow generated by the advance of the aircraft extends in the radial direction of the exchanger. Moreover, said preferred variation in thickness of the edge of the ring confers a double curvature to the ring in the axial direction, according to different generatrices respectively defining the external surface of revolution and the internal surface of revolution of the ring.

Such an aerodynamic configuration of the ring limits the formation of turbulence on its external face and makes it possible to reduce the drag of the advancing aircraft. Moreover, by the double axial curvature of the ring, or in other words by the variation in the thickness of its edge, the circulation of fluids inside the modules is regulated such that their speed of circulation through the channels which are assigned thereto is as uniform as possible whatever the state of the fluid.

According to one embodiment, said at least one space is closed by an external cover and an internal cover of the ring, which are respectively created on the external face and the internal face of the ring.

Such covers make it possible to channel the air inside said at least one space by avoiding an escape of air circulating through the space between the axial ends of the ring. This makes it possible to optimize the heat exchange between the air admitted inside the space and said at least one heat-transfer element and/or promotes a laminar flow of air through said at least one space.

According to one embodiment, said covers are each formed by at least one cover element integral with at least one of said two adjacent modules.

For example, the covers may each be formed from a single cover element integrated in one or other of said walls. In this case, the cover element is integrated in one of said walls and is preferably sealed relative to the other of said walls in order to obtain a sealed covering of the space.

By way of a further example, the covers may each be formed by a pair of cover elements respectively integrated in one and the other of said walls, being preferably sealed to one another on their adjoining edges which extend along the axial extension of the ring in order to obtain a sealed covering of the space.

By way of a further example, the covers or cover elements integrated in said one and the same wall may be integral with one another, being created at the ends of an adjoining wall extending between the external face and the internal face of the ring. In other words, the covers may be connected together by said one adjoining wall, forming a single body having a U-shaped profile in the radial direction, the arms thereof forming the respectively external and internal covers or cover elements and the base thereof creating the adjoining wall which is attached by application against one of said opposing walls.

In this case, said adjoining wall:

contributes to the additional thermal transfer heat exchanger by promoting a uniform distribution of the calories or frigories provided by said at least one heat-transfer element toward the surface of the wall of the module on which the adjoining wall is attached; and/or preferably comprises at least one passage opening for the passage of said at least one heat-transfer element, in particular individual passage openings of said fins through said adjoining wall.

According to an advantageous embodiment, the constituent modules of the heat exchanger are produced by printing a metal, in particular aluminum, in three dimensions.

According to preferred features, which may be combined with one another and with those above:

the heat-transfer elements consist of fins, each protruding substantially perpendicularly from one of said module walls;

each fin is made in one piece with the wall;

said module walls each delimit one of said second channels for the circulation of cooling fluid;

in at least one of said spaces created between two adjacent modules, each heat-transfer element is produced by two protruding fins arranged in the extension of one another, one of these fins protruding from one of said opposing walls and the other of these fins protruding from the other opposing wall;

the exchanger comprises, for each heat-transfer element, a separating distance between the ends of the two fins;

the first channels and the spaces extend in the same direction which is that of the air flow;

the second channels also extend in the same direction which is that of the air flow.

DESCRIPTION OF THE FIGURES

The invention will be understood more clearly by reading the following detailed description of an embodiment of the present invention, relative to the following figures.

DETAILED DESCRIPTION

Figure 1:
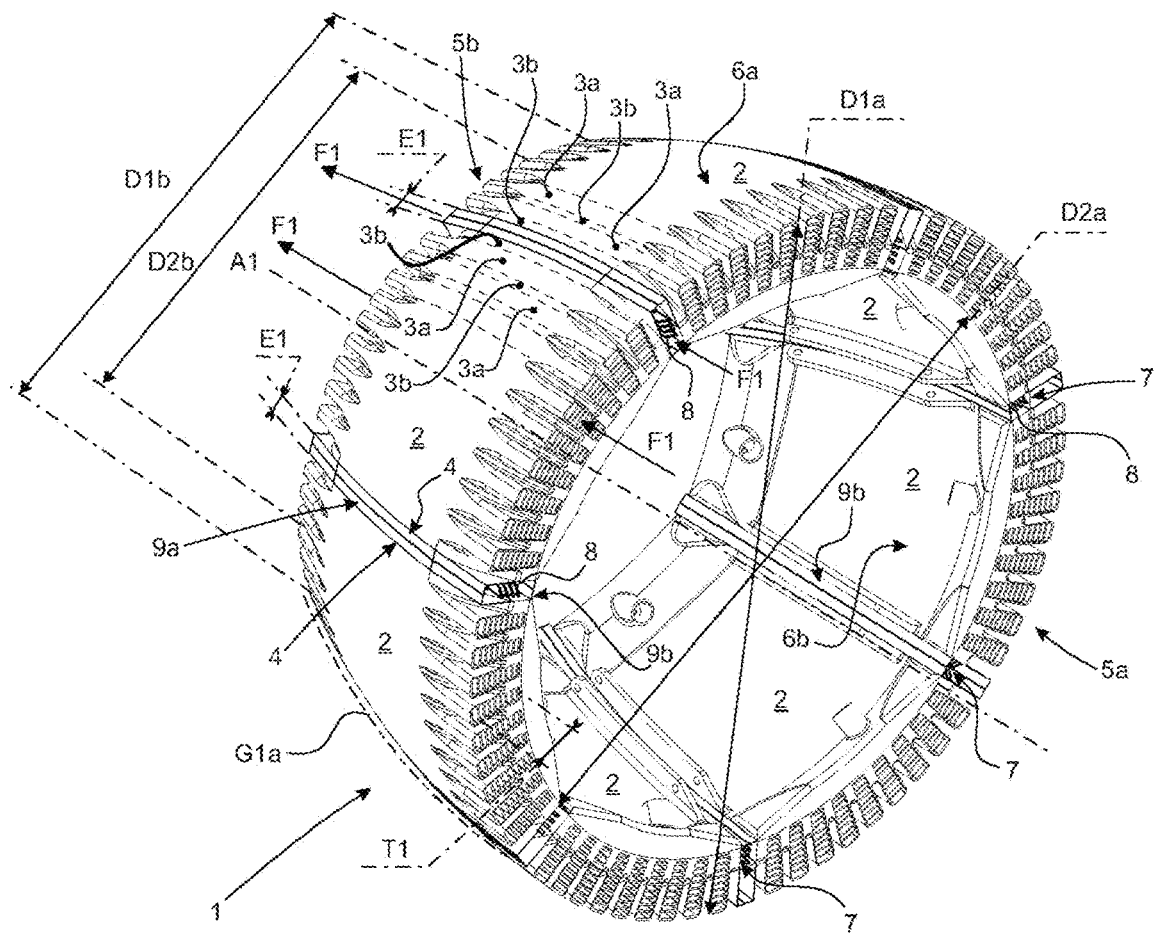
FIG. 1 shows a perspective illustration of a heat exchanger according to an embodiment of the invention.

The figures and the non-limiting detailed descriptions thereof disclose the invention according to particular methods which are not limiting regarding the scope of the invention as claimed. The figures and their detailed descriptions of an exemplary embodiment of the invention may serve to define said exemplary embodiment in an optimized manner, if required in relation to the general description which has been made above. Moreover, to avoid overloading the figures and to facilitate the reading thereof, the reference numerals assigned to the terms and/or concepts used to describe the invention and indicated on any one of the figures are potentially repeated in the description of any other figure without implying the presence thereof in all of the figures.

In FIG. 1, a heat exchanger 1 for cooling an aircraft propulsion engine has an annular configuration having the axis A1. The exchanger 1 is provided for any type of motorized aircraft, such as airplanes, helicopters, rockets, missiles, etc.

The heat exchanger 1 comprises a plurality of heat exchanger modules 2 which are mutually independent, being distributed circumferentially about the axis A1 of the ring. The modules 2 are assembled with one another, being successively spaced apart in pairs, with the resulting formation of spaces E1 created between two adjacent modules 2. The spacing-apart permits the formation of a modular annular heat exchange assembly, the mechanical structure thereof being optimized. Such spaces E1 are each traversed by the air flows F1a generated by the advancing aircraft. Each space E1 forms a circulation channel for the air flow F1a generated by the advancing aircraft.

Each module 2 comprises first channels 3a for the circulation of the air flow F1b generated by the advancing aircraft. The air flows F1b passing through the modules 2 are utilized for cooling a cooling fluid which circulates through the second channels 3b which each of the modules comprise, and are utilized at the outlet of the heat exchanger 1 to cool a propulsion engine of the aircraft. It is understood by reading the figures that the first channels 3a and the second channels 3b are illustrated in broken lines and partially referenced in number.

The first channels 3a located inside the modules 2 and the channels formed by the spaces E1 extend in the same direction (i.e. in the direction of the air flow F1a). All of the channels 3a, 2 are parallel and distributed over the circumference of the heat exchanger 1.

The second channels 3b also extend in the same direction F1a as the first channels 3a and the channels formed by the spaces E1.

The internal design of the exchanger is thus both simplified and optimized, all of the channels which circulate the flow F1a of air (first channels 3a and channels formed by the spaces E1), in addition to all of the channels which circulate the fluid to be cooled (second channels 3b), extend in the same direction, sharing the heat exchange walls therebetween.

Figure 2:
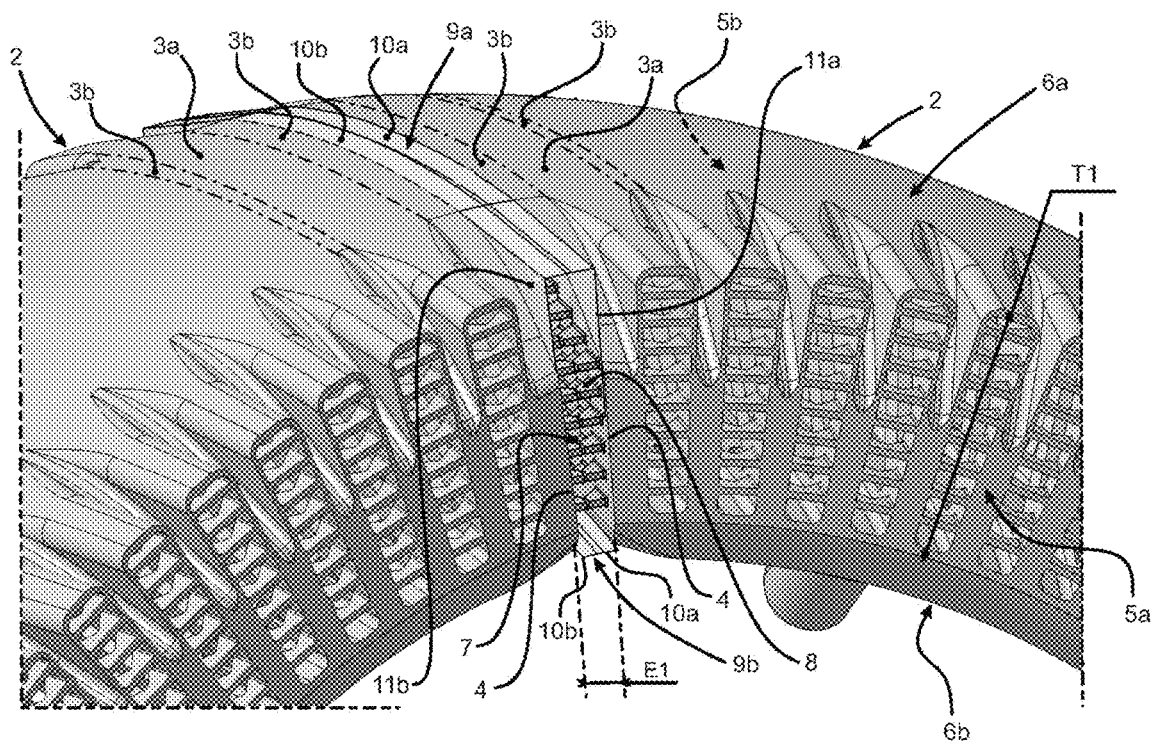
FIG. 2 shows a perspective illustration of a detail of the heat exchanger shown in FIG. 1.
Figure 3:
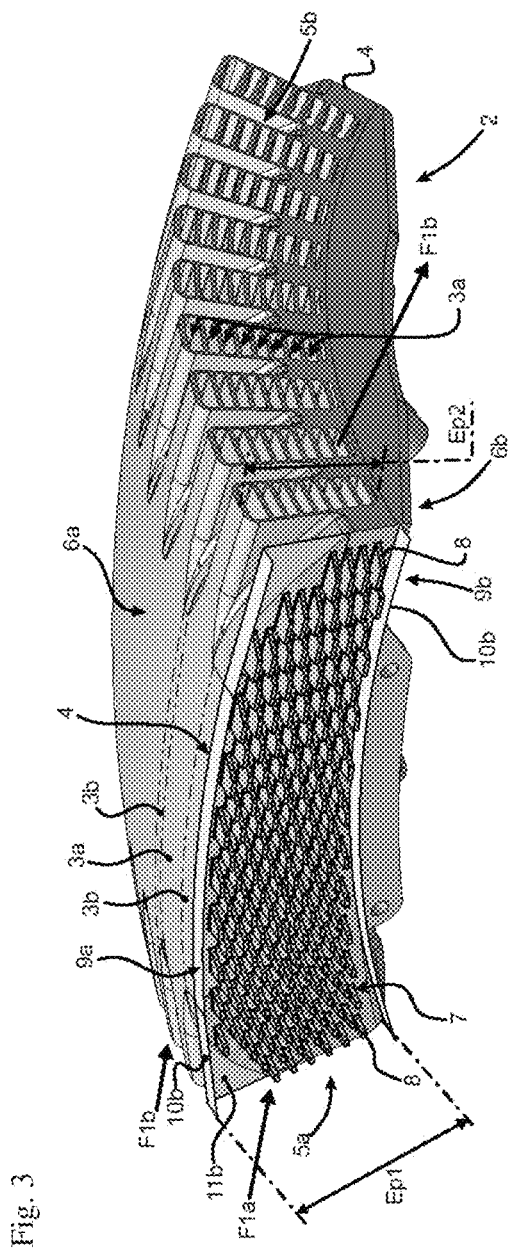
FIG. 3 shows a perspective illustration of a pair of adjacent heat exchange modules which the heat exchanger shown in FIG. 1 comprises.

More particularly visible in FIGS. 2 and 3, it will be noted that the modules 2 are provided at each of their radial ends with said one second channel 3b which is delimited by at least one radial end wall 4 of the modules 2 which is oriented toward the separating spaces E1 between two adjacent modules 2. In other words, the adjacent radial end walls 4 of the modules 2 are walls 4 of the modules 2 which are oriented facing one another, said one space E1 being formed therebetween.

The ring forming the heat exchanger 1 has more specifically a generally conical shape, being axially tapered A1 from an axial end 5a upstream of the ring toward an axial end 5b downstream of the ring, the terms "upstream" and "downstream" being defined according to the direction of circulation of the air flows F1a, F1b through the heat exchanger 1. The ring forming the heat exchanger 1 has an external face 6a identified by at least one larger external diameter D1a, D1b of the ring and an internal face 6b identified by at least one smaller internal diameter D1a, D2b of the ring.

More particularly visible in FIG. 3, a first generatrix defining the surface of revolution of the external face 6a of the ring and a second generatrix defining the surface of revolution of the internal face 6b of the ring are differentiated, which provides the ring along the axis A1 with a double curvature, respectively on its external face 6a and its internal face 6b.

Said spaces E1 each receive conductive heat-transfer elements 7 which extend between the respective opposing walls 4 of two adjacent modules 2. The heat-transfer elements 7 are subjected to the air flow F1a traversing the spaces E1 during the advance of the aircraft for the cooling thereof. The heat-transfer elements 7 thus cooled transfer their heat by conduction to said opposing walls 4, to contribute to the cooling of the cooling fluid via said opposing walls 4.

More particularly visible in FIGS. 2 and 3, the heat-transfer elements 7 are formed from a plurality of fins 8 which are integrated in the opposing walls 4 of two adjacent modules 2, respectively in sets of fins 8. Each fin 8 protrudes substantially perpendicularly from the wall 4, being made in one piece with the wall 4.

The fins 8 each extend principally along an overall plane which is oriented between the walls 4 facing one another. Each space E1 is delimited by two radial end walls 4 of two modules 2, and each of these walls 4 also delimits one of the second channels 3b. In each space E1, each heat-transfer element 7 is produced by two protruding fins 8 arranged in the extension of one another, one of these fins 8 protruding from one of the walls 4 delimiting the space E1 and the other of these fins protruding from the other wall 4. In other words, the fins 8 are arranged in pairs of fins 8 which each protrude from one of the walls 4 facing one another.

Moreover, for each pair of fins 8 facing one another, the ends of these fins 8 are not in contact, a small separating distance being provided between the two ends of these opposing fins 8 (see FIG. 3). This assembly makes it possible to ensure a heat exchange in the spaces E1 which is as efficient as in the first channels 3a, whilst maintaining the possibility of disassembling the exchanger 1 by disassembling the modules 2, without any intervention relative to the heat-transfer elements 7. The mutual assembly and disassembly of the modules 3 assembles or disassembles the heat-transfer elements 7 produced by the fins 8 jointly with the modules 2 in a simple and rapid manner.

Moreover, for each pair of opposing fins 8 in the space E1, the separating distance provided between the two ends of fins 8 allows for the deformations caused by changes in temperature without having any consequences for the mechanical structure of the assembly. These separating distances also make it possible to create modular exchangers in which, for example, a module 2 may be added to an existing exchanger 1 by being interposed between two further modules 2. The exchanger 1 will thus be modified by adding a module 1 and thus will increase in diameter which will change the angles formed at the junction between each pair of modules 2, without having any consequences for the heat exchange in the region of the spaces E1, due to the presence of these separating distances between each pair of opposing fins 8.

More particularly visible in FIG. 3, the generatrices defining the surfaces of revolution respectively of the external face 6a and of the internal face 6b of the ring are differentiated as referred to above. The ring thus has along its edge T1 a variation in thickness Ep1, Ep2 between its axial ends 5a, 5b. The fins 8 are distributed between the modules 2 according to a plurality of said guidelines which are parallel to one another and which extend in particular according to one of said generatrices, such as for example according to the second generatrix defining the surface of revolution of the internal face 6b of the ring.

As a result, the number of fins 8 created inside each of the spaces E1 varies along the axis A1 according to the variation in thickness Ep1, Ep2 of the edge T1 of the ring. More specifically, considering the number of fins 8 created at the respective axial ends 5a, 5b of the ring, the number of fins 8 reduces from the axial end 5a upstream of the ring to its downstream axial end 5b. Further variants, not shown, may be implemented for distributing the fins 8 inside the spaces E1, in particular according to the drainage conditions of the air flows F1a traversing the spaces E1, making it possible to control the flow thereof and thus reduce the drag of the aircraft in an optimized manner.

More particularly visible in FIGS. 2 and 3, the spaces E1 are closed on the external face 6a of the ring and on the internal face 6b of the ring, in order to channel the air flows F1a which traverse the spaces E1 and in order to force the passage thereof between the fins 8 for the cooling thereof. To this end, covers 9a, 9b are placed respectively on the external face 6a of the ring for an external cover 9a and on the internal face 6b of the ring for an internal cover 9b.

According to the illustrated example, each of the covers 9a, 9b is composed of two cover elements 10a, 10b which are respectively integral with opposing walls 4 of two adjacent modules 2. The adjacent edges along the axial extension A1 of the cover elements 10a, 10b consisting of one and the same cover 9a, 9b are sealed relative to one another to prevent an escape therebetween of the air from the air flow F1a flowing through the spaces E1.

The cover elements 10a, 10b which are integral with one and the same wall 4 constituting a module 2 are connected integrally to one another by being created at the respective ends of an adjoining wall 11a, 11b extending between the external face 6a and the internal face 6b of the ring. In other words, a covering element of one and the same space E1 is formed from a one-piece assembly arranged in a section which has a U-shaped profile. The covering element comprises an external cover element 10a or 10b and an internal cover element 10a, 10b connected together by an adjoining wall 11a, 11b. Two covering elements cooperating together are respectively applied against the opposing walls 4 of two adjacent modules 2.

It will be noted that the spaces E1 separating two adjacent modules are thus each occupied by an additional thermal transfer heat exchanger which is interposed between two adjacent modules. The additional thermal transfer heat exchanger comprises a housing formed by said covering elements adjacent to one another, said housing receiving the heat-transfer elements 7, making it possible to cool the opposing walls 4 of the two adjacent modules.

Each of the modules 2 is advantageously produced by printing a metal material, in particular aluminum, in three dimensions. According to one embodiment, not shown, each of the modules 2 may be composed of a plurality of elementary modules which are individually produced by printing in three dimensions and which are in abutment against one another in fluidic communication along the axis A1. Such an abutment may be implemented by sealing and/or by successively nesting the elementary modules in pairs, possibly in a sealed manner, the first channels 3a and the second channels 3b of the elementary modules in abutment respectively being in fluidic communication with one another. This makes it possible to produce modules 2 by printing in three dimensions at low cost and/or to enable the heat exchanger 1 to be provided with a low-cost adaptation of its axial extension A1 according to the cooling requirements to be supplied.

The invention claimed is:

1. A heat exchanger (1) for cooling an aircraft propulsion engine, the heat exchanger (1) having a ring-shape and comprising:
  a plurality of heat exchange modules (2) which are mutually independent and being distributed circumferentially about the axis (A1) of the ring, said modules (2) being assembled with one another and being successively spaced apart in pairs, each module comprising:

a first set of channels (3a) for the circulation of the air flow (F1b) generated by the advancing aircraft;

a second set of channels (3b) for the circulation of cooling fluid, wherein a space (E1) traversed by the air flows (F1a) generated by the advancing aircraft is created between two adjacent modules (2), at least one of said spaces (E1) receiving at least one conductive heat-transfer element (7) extending between respective walls (4) of at least two adjacent said modules (2) which are oriented facing one another; and wherein said at least one space (E1) is closed by an external cover (9a) and an internal cover (9b) of the ring, which are respectively created on the external face (6a) and the internal face (6b) of the ring.

2. The heat exchanger (1) as claimed in claim 1, wherein said at least one heat-transfer element (7) is integrated in at least one of said walls (4) facing one another.

3. The heat exchanger (1) as claimed in claim 1, wherein said walls (4) facing one another inside the modules (2), of which the walls are respectively a constituent part, delimit a channel (3b) for the circulation of a cooling fluid inside the modules (2).

4. The heat exchanger (1) as claimed in claim 1, wherein each one of the at least one conductive heat-transfer elements (7) are received in said at least one and the same space (E1).

5. The heat exchanger (1) as claimed in claim 4, wherein each one of the at least one conductive heat-transfer elements (7) are fins (8) oriented substantially, according to an overall plane extending between said walls (4) facing one another.

6. The heat exchanger (1) as claimed in claim 4, wherein each one of the at least one conductive heat-transfer elements (7) are distributed between the modules (2) according to at least one guideline oriented parallel to a generatrix defining the surface of revolution of any one of the external face (6a) and the internal face (6b) of the ring.

7. The heat exchanger (1) as claimed in claim 1, wherein said covers (9a, 9b) are each formed by at least one cover element (10a, 10b) integral with at least one of said two adjacent modules (2).

8. The heat exchanger (1) as claimed in claim 1, wherein the constituent modules (2) of the heat exchanger (1) are produced by printing a metal in three dimensions.

9. The heat exchanger (1) as claimed in claim 1, wherein the heat-transfer elements (7) further include fins (8), each protruding substantially, perpendicularly from one of said module (2) walls (4).

10. The heat exchanger as claimed in claim 9, wherein each fin (8) is made in one piece with the wall (4).

11. The heat exchanger as claimed in claim 1, wherein said module (2) walls (4) each delimit one of said second channels (3b) for the circulation of cooling fluid.

12. The heat exchanger as claimed in claim 1, wherein at least one of said spaces (E1) created between two adjacent modules (2), each heat-transfer element (7) is produced by two protruding fins (8) arranged in the extension of one another, one of the fins (8) protruding from one of said opposing walls (4) and the other of the fins (8) protruding from the other opposing wall (4).

13. The heat exchanger as claimed in claim 12, further comprising for each heat-transfer element (7), a separating distance between the ends of the two fins (8).

14. The heat exchanger as claimed in claim 1, wherein the first channels (3a) and the spaces (E1) extend in the same direction, which is that of the air flow (F1a).

15. The heat exchanger as claimed in claim 14, wherein the second channels (3b) also extend in the same direction, which is of the air flow (F1a).

16. A heat exchanger (1) for cooling an aircraft propulsion engine, the heat exchanger (1) having a ring-shape and comprising:

a plurality of heat exchange modules (2) which are mutually independent and being distributed circumferentially about the axis (A1) of the ring, said modules (2) being assembled with one another and being successively spaced apart in pairs, each module comprising:

a first set of channels (3a) for the circulation of the air flow (F1b) generated by the advancing aircraft;

a second set of channels (3b) for the circulation of cooling fluid, wherein a space (E1) traversed by the air flows (F1a) generated by the advancing aircraft is created between two adjacent modules (2), at least one of said spaces (E1) receiving at least one conductive heat-transfer element (7) extending between respective walls (4) of at least two adjacent said modules (2) which are oriented facing one another;

wherein each one of the at least one conductive heat-transfer elements (7) are received in said at least one and the same space (E1); and wherein since the ring has along its edge (T1) a variation in thickness (Ep1, Ep2) between its axial ends (5a, 5b), the number of heat-transfer elements (7) varies axially (A1) according to the variation in thickness (Ep1, Ep2) of the edge (T1) of the ring.

* * * * *